INVENTOR
CLAUDE E. JONES, JR.
BY Philip M. Bolton
ATTORNEY

INVENTOR
CLAUDE E. JONES, JR.
BY Philip M. Bolton
ATTORNEY

INVENTOR
CLAUDE E. JONES, JR.
BY Philip M. Bolton
ATTORNEY

Dec. 8, 1959 C. E. JONES, JR 2,916,727

DATA PROCESSING SYSTEM

Filed May 10, 1955 4 Sheets-Sheet 4

INVENTOR
CLAUDE E. JONES, JR.
BY Philip M. Bolton
ATTORNEY

United States Patent Office 2,916,727

Patented Dec. 8, 1959

2,916,727

DATA PROCESSING SYSTEM

Claude E. Jones, Jr., Belleville, N.J., assignor to International Telephone and Telegraph Corporation, Nutley, N.J., a corporation of Maryland Application May 10, 1955, Serial No. 507,205

14 Claims. (Cl. 340—174)

This invention relates to a data processing system in which data in the form of a stationary time series of information bits is scanned and the extracted information is fed to a data-handling device. More particularly the present invention relates to such a data processing system having a data-bearing record (optical, magnetic, electrostatic, etc.) which is repeatedly scanned at one speed, while the data is fed at another speed to a data-handling device, such as an automatic printer.

Many systems have heretofore been devised in which stored data has been scanned and the extracted data then used to control or operate a data-handling device. Some general forms of such systems are found in computers and in automatic printing systems. Such systems may generally be divided into three main components: a storage device, a data-handling device, and a connecting system which scans the stored data and feeds it in proper form to the data-handling device. In the storage device the data may be stored optically, for example, in the form of a photograph, a printed record, a picture on the face of a cathode ray tube, etc. The information may be stored magnetically, as, for example, on a magnetic tape or drum, or electrostatically, as, for example, in the form of condenser charges or charges on the storage mosaic of a cathode ray tube. The information may also be stored electrically in the form of currents, or pulses running in a loop or loops, or mechanically, as for example, in the position of relay contacts. Frequently, such data is stored in coded form, usually binary. The data-handling devices may consist of computers, automatic printers, such as teletypewriters and Flexowriters, card-punching machines, and numerous other devices which need not here be mentioned. The connecting system between the storage device and the data-handling device must extract the data from the storage device and present it to the data-handling device in a form matching the characteristics of the latter. Certain mechanical data-handling devices, such as automatic printers, are only capable of operating at slow speed while certain scanning devices, such as the flying spot scanner, operate best at relatively much greater speeds. While it is possible to devise slow-speed scanners, these usually are mechanical, and are expensive, cumbersome and insufficiently reliable in a field where reliability is usually of extreme importance. Satisfactory slow-speed scanners of the electronic type have heretofore not been built due partially to the problems of linearity of scan and control thereof and other difficulties attendant upon slow speed operation which tend towards unreliability. On the other hand, a highly satisfactory scanner of the electronic type, such as the flying spot scanner, which operates best at high speeds feeds the data at speeds too high for automatic printers and other data-handling devices which operate satisfactorily only at low speeds.

To further complicate the problem, it is sometimes desired to represent the data on a cathode ray tube screen for purposes of visual observation as, for example, in monitoring while at the same time feeding it to a slow-speed data-handling device. Due to the limited persistence of screen phosphorescence the only way a picture of the data can be held stationary on the screen without fading is to write the data on the screen with an electron beam at a rapid speed and continue to repeat this writing at the same rapid speed so that a stationary picture of the data is obtained. This implies that the stored data is also rapidly scanned, which can of course readily be done by the flying spot scanner. Thus, it will be seen that in this system it is essential to have a rapid scanning of the stored data for the purposes of feeding the monitoring tube while at the same time the data must be slowly fed to the data-handling device.

An object of the present invention is the provision of a data processing system in which the data is scanned at a rapid speed while the extracted data or information is fed at a relatively slow speed to a data-handling device.

Another object of the present invention is the provision of a data processing system in which the data is scanned at a relatively high speed and the extracted data is fed at said high speed to a monitoring device while being fed at a relatviely slow speed to a data-handling device.

In accordance with a main feature of the present invention there is provided a stationary time series of information bits, which may be derived, for example, from repeatedly scanning a single data record a number of times. At each scanning a series of information bits is obtained and this series of information bits is repeated periodically. At each repetition or after a given number of repetitions a different group of the information bits in the series is extracted. Each group may represent a character, such as a letter of the alphabet or a numeral. These extracted groups are then fed to operate a data-handling device. This data-handling device may be of the type which is capable of responding to information presented to it at such relatively slow rates while incapable of responding to information if fed to it at the rate at which the bits or groups of bits follow each other in the series. All the data in the series may eventually be extracted or only selected portions thereof.

In accordance with another aspect of the present invention, a flying spot scanner repeatedly scans a data record at high speed to derive a stationary time series of information bits and a different one or group of said information bits is extracted from the stationary time series at each scanning or at each of a plurality of scannings of the record by the flying spot scanner and fed to a data-handling machine, such as an automatic printer.

In accordance with a still further aspect of the present invention, a data processing system is employed using a storage record which includes one or more pictures each associated with coded information. This record is repeatedly scanned at high speeds and a picture thereof is produced by feeding the scanned information to a monitoring cathode ray tube to produce a stationary picture of the selected portion of the record being monitored, as in a closed circuit television system. The rapid scanning thus produces a stationary time series of information bits from which time series there may be extracted, at a slow rate, groups of information bits, representing, for example, characters, which are fed at said slow rate to a data processing device such as a teleprinter which is only capable of responding to such data at such slow rate.

Other and further objects of the present invention will become apparent, and the foregoing will be better understood with reference to the following description of embodiments thereof, reference being had to the drawings, in which.

Figure 1:
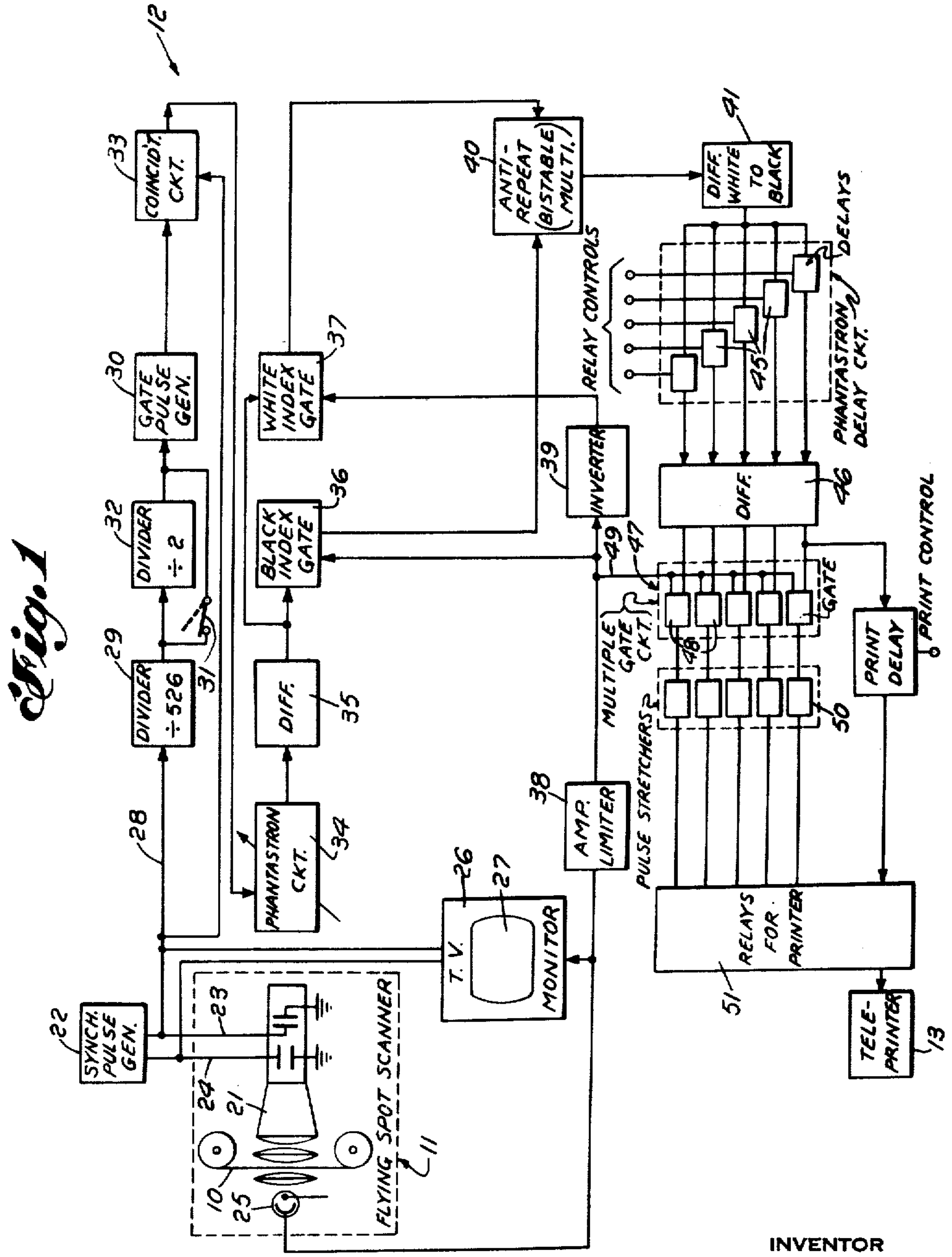
Fig. 1 is a block diagram of a data processing system in which data recorded in the form of a code on a photograph is used to operate a teleprinter and produce a visual indication on the television monitor.
Figure 2:
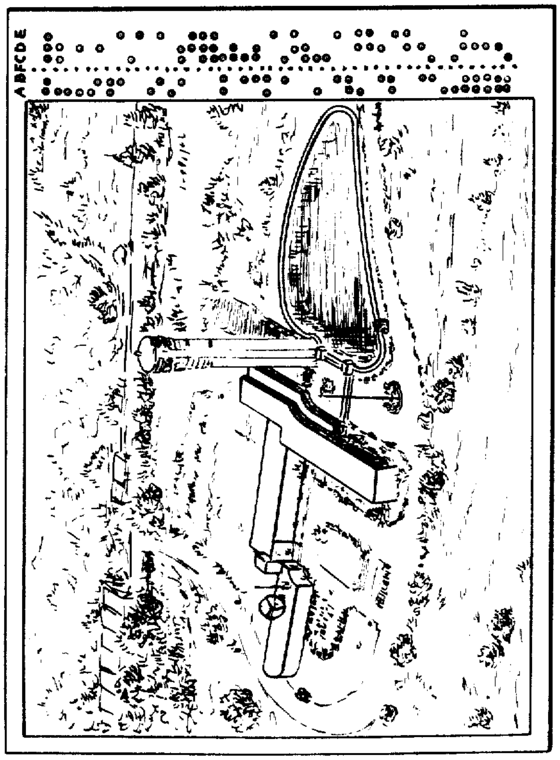
Fig. 2 is a schematic representation of one form of filmed record used in the system of Fig. 1.
Figure 3:
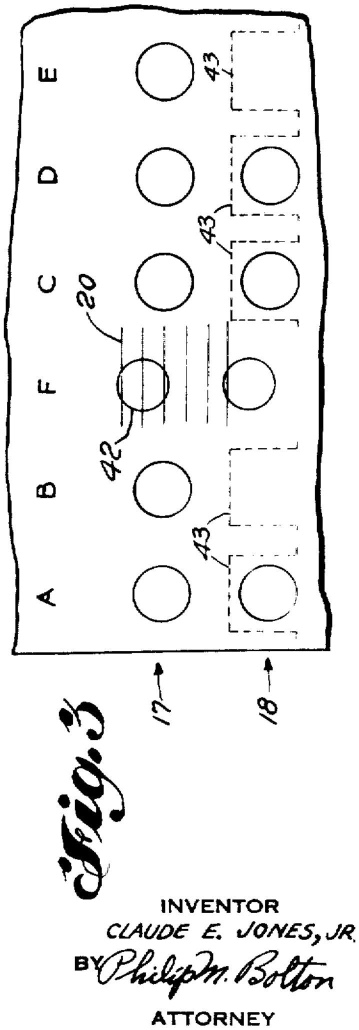
Fig. 3 is a greatly enlarged representation of a detail of the data recorded on the record of Fig. 2.

Referring to Fig. 1, a data processing system is illustrated in which information on a record 10 is scanned in a flying spot scanner 11 at a high rate of speed and then fed, through a connecting system, generally designated as 12, at a suitably slow rate, to a teleprinter 13. The record 10, for example, may consist of a black and white photographic film in which one frame 14 is shown in Fig. 2. This frame consists of a picture 15 and associated data 16 recorded thereon in the form of a five-position binary code of black dots representing each character, the code for each character being written on a separate horizontal row. For example, row 17, Fig. 3, shows in code form a character in which there is a black mark or dot in each of the digital code positions or columns ABCDE. In row 18 a dot appears in digital positions A and C and D while no dot appears in digital positions B and F. In each row in column F, between the second digital position B and the third digital position C there is an indexing black dot 19 which is a little above the code dots and is used in the read-out process as explained hereinafter.

In the flying spot scanner the film 10 is held stationary and frame 14 is scanned from top to bottom in successive horizontal sweep lines 20 as in the usual television raster. This scanning is repeated many times and a different character is extracted after each of a given number of repetitions and printed. This process is continued until all the encoded characters in the frame have been printed by the teleprinter. The film may then be advanced to the next frame in a manner not shown, but known to the art. Furthermore, this may be done automatically by obvious means.

The horizontal sweep lines 20 are preferably close together so that there is no possibility of a row of dots representing a character being skipped by falling between two successive horizontal sweeps. In the example shown in frame 14 there are approximately six horizontal lines for every row of dots with about three lines passing through each row of dots and three lines falling in the spaces therebetween. When using such close sweep lines it no longer becomes necessary to precisely position the film or slide vertically in the scanner.

For the purpose of scanning the frame, there is provided a flying spot scanner 11 which includes a cathode ray tube 21 upon whose face a raster is produced under the control of horizontal and vertical deflection pulses fed from a synchronizing pulse generator 22 along conductors 23 and 24 to the usual deflection plates. A photo-multiplier tube 25 converts the data scanned by the tube 21 into a corresponding video signal which is fed in turn to a monitor television receiving type tube 26 to produce on its screen 27 a visual image of the recorded data. Since the same frame is repeatedly scanned by the flying spot scanner, the video signal is in the form of a stationary time series of informational bits which form a stationary picture on the monitor tube 26. Tube 26 is synchronized with the scanning of tube 21 by using the same pulse synchronizing generator 22 to feed both in a manner known in closed circuit television systems.

The scanning in the flying spot scanner 11 is done at a relatively high speed. For example, the scanning may be done at the same rate as in current television practice in the United States with the picture being scanned at the rate of 60 fields per second, the fields being interlaced so as to produce a complete scanning of the frames at the rate of 30 frames per second, there being 525 lines per complete frame or 15,750 lines per second. Assuming that in the case indicated there is one encoded character per line, this would feed out information at a relatively high speed. Assuming that a character is read out once every six horizontal sweep lines (no character being read out during the other five intervening sweep lines in order to prevent repeated printing of the same character), information is still being read out at a high speed of approximately 2,625 characters per second. The standard teleprinter can conveniently handle between five and ten operations per second, printing of a character being such an operation. It is, therefore, quite apparent that the information derived from the flying spot scanner cannot be fed directly to operate a teleprinter.

As stated hereinbefore, the above difficulty is overcome by repeatedly scanning the picture to produce a stationary time series of information bits and extracting a group of these bits (representing one character) at widely spaced intervals of 5–10 per second which the teleprinter is fully capable of handling. This wide spacing of extracted characters is achieved by extracting one character from the video signal at one scanning of a frame and extracting the next character one or more frames later and, in the given example, six frames later. Thus at a 30 frame per second rate, 5 characters per second would be extracted and fed to the teleprinter.

In carrying out this operation the index pulse corresponding to a black index dot is used to control the opening of a character feeding gate which selects an encoded character to operate the teleprinter. It is not, however, every succeeding index pulse that is used for this purpose since obviously this would present the characters at far too rapid a rate. In accordance with the present invention the time employed in sweeping successive rasters is used to produce the desired delay between successive character feedings. In doing this one horizontal line is examined in each frame, at the point of the line where an index pulse should be, to determine if there is an index pulse there, with, for example, the first line being examined for the index pulse in the first frame, the second line being examined in the second frame, the third line in the third frame, etc. When an index dot is first encountered during such examination the character gate is opened and a character is printed. In the next five frames during which the next five horizontal sweep lines are examined (in five successive frames), even if such an index dot is again encountered, as it would be in the second and third lines, since there are about three lines covering each index dot, nevertheless the index pulse is blocked from opening the character gate in an arrangement which prevents the repeated printings of the same character. Upon examination of the sixth line (six frames later) a new index pulse is encountered, and this again opens the character feeding gate. This process continues with a new index pulse being selected every six frames plus six lines to open the index gate until all the characters in the frame have been printed.

To enable the following description of Fig. 1 to be followed more easily, the description will be broken down in accordance with the foregoing into the following operations:

I. Examining of a different line in each succeeding frame to find index pulses;

II. Inhibiting application of any index pulse found from printing a character after said index pulse has once caused a character to be printed; and, III. Operation of the character feeding gate in response to an applied uninhibited index pulse to print a character.

I. *Examining of a different line in each succeeding frame to find index pulses*

In the system of Fig. 1 the timing of the foregoing operation is produced by feeding the horizontal synchronizing pulses from generator 22 via line 28 to a pulse frequency divider 29. Assuming that there are 525 lines to the frame, as heretofore suggested, the divider 29 divides by 526, that is, it produces one output pulse for every 526 input pulses. The divider may take any one of a number of well known forms and, particularly, consists of a chain of bistable multivibrators with suitable feedbacks to obtain this desired ratio. The output pulse from divider 29 is directly fed to a gate pulse generator 30 via switch 31 or through another frequency divider 32 to the gate pulse generator 30, depending upon whether faster or slower read-out is desired. The frequency divider 32 divides by two so that the read-out can be controlled to take place at half the rate if the teleprinter used is particularly slow or if any other data processing is used, such as a card-punching machine, which requires a slower rate. Additional frequency dividers might also be employed for further slowing down of the rate or the dividing ratio of divider 32 may be suitably changed for this purpose. For the purposes of the immediate discussion, it will be assumed that switch 31 is closed and the dividing ratio is 526 which occurs in divider 29. The gating pulse generator 30 in this case produces one gating pulse for every 526 lines, which is equal to one frame plus one horizontal line. The gating pulse has a sufficient duration to bracket a single one and only one of the synchronizing pulses from generator 22 which is fed simultaneously therewith into a coincidence circuit 33. Thus, the output of coincidence circuit 33 consists of a pulse which corresponds with a given point on every 526 scanning lines. This pulse is then delayed so that it coincides or corresponds in time to that time at which the horizontal sweep of its corresponding line is in column F, the column in which the index dots appear, the delayed pulse being used to select an index pulse when it is reached. The delay of the pulse from coincidence circuit 33 may be effected by means of a Phantastron circuit which produces an adjustable width pulse whose trailing edge is differentiated in a differentiator 35 to produce the delayed pulse. The delayed pulse is applied to a pair of gates 36 and 37 which will be referred to hereinafter as the black and white index gates, respectively and simultaneously the video signal from the photomultiplier is applied to these gates.

Before being applied to said gates the video signal from photo-electric cell 25 is amplified and limited to produce rectangular pulse forms in amplifier-limiter 38, the output of amplifier-limiter 38 being directly applied to the black index gate 36 and inverted in inverter 39 before being applied to the white index gate 37. When an index pulse from amplifier-limiter 38 coincides with a delayed pulse from differentiator 35, an output is produced from the black index gate 36. If no index pulse occurs at the time of a delayed pulse, then there is no output from the black index gate 36. Since each delayed pulse occurs every 526 lines, it will be seen that in effect a different succeeding horizontal sweep line in each succeeding frame is scanned to find the index pulses. Each index pulse passing through black gate 36 might be employed to operate the character feeding gate, but this would cause repeated printing of the same character since in the example given the index dots are as wide as three succeeding lines. It therefore becomes necessary to inhibit the application of the index pulse produced at the output of black index gate 36 from operating the character gate.

II. *Inhibiting application of any index pulse found from printing a character after said index pulse has once caused a character to be printed*

This inhibiting operating is accomplished in the following way. The output of black index gate 36 is applied to one side of a bistable multivibrator 40 to trip it into one of its two conditions and the output of the white index gate 37 is applied to the other side of said bistable multivibrator 40 to trip it into its second stable condition. When an index dot is first encountered during the sweep of the flying spot scanner across the record 14, the black index gate 36 being opened, it trips the bistable multivibrator from its second condition or white condition to its black condition. This produces a change in the output voltage fed to a differentiating circuit 41 which thereupon produces an output pulse in response to the change in the multivibrator from white to black which is of the proper polarity to operate the character feeding gate and to gate out the character in a manner that will be subsequently described. At the same time the video pulse corresponding to the black index dot is inverted in inverter 39 so as to be negative and to keep the white index gate 37 closed so that no effect is produced thereby on the multivibrator 40. Another 526 lines later, another delayed pulse is applied to the black and white index gates 36 and 37 while at the same time the video signal is applied thereto. If, as has been assumed, there are three sweep lines to a horizontal dot, at this encounter also the index dot will be traversed by the scanning line and at the moment the delayed pulse from differentiator 35 is applied to gates 36 and 37 the same index pulse will be applied to said gates. Again, the black index gate will produce an output which will be applied to multivibrator 40, but since multivibrator 40 has already been tripped from its second to its first condition it will remain in said first condition. This operation will be repeated a third time, that is, another 526 lines later the same black index dot will be encountered and an index pulse produced at the output of gate 36 which will still tend to keep the multivibrator in said first condition. The next time a delayed pulse from differentiator 35 is applied to gates 36 and 37, 526 horizontal lines later, the video information applied to the gate 36 will be negative since the black index dot has now been passed and the scanning line is passing in the open space between two index dots. This negative pulse applied to black index gate 36 simultaneously with the pulse from differentiator 35 will produce no output and will not affect the multivibrator 40. However, this negative pulse is inverted in inverter 39 and becomes positive if applied to white index gate 37. Therefore, because of the coincidence of the pulse from inverter 39 and the delayed pulse from differentiator 35 an output is produced which is applied to the other side of the multivibrator 40 to trip it from its first condition to its second condition. This change of condition produces an output pulse from differentiator 41 which is negative and of improper polarity to affect subsequent equipment, and consequently produces no opening of the character gate. The effect of retripping bistable multivibrator 40 to its second condition is to prepare it so that it may be tripped when the next index dot is gated through gate 36. Until this occurs, however, the flying spot scanner continues to scan successive frames, and every 526 lines a delayed pulse is applied to gates 36 and 37 to sample the video information obtained at one particular point of each 526 lines along column F of Fig. 3 of the record 14 until finally at one of said samples a new index dot is encountered and retrips multivibrator 40 from its second condition to its first condition causing differentiator 41 to emit an output pulse of proper polarity to operate the character feeding gate.

III. *Operation of the character feeding gate in response to an applied uninhibited index pulse to print a character*

This output pulse from differentiator 41 is then delayed by different amounts to produce a plurality of differently delayed pulses, each of which coincides with a different one of the informational bits forming a character on the next line. Thus, for example, the output pulse from differentiator 41 corresponding to the first scanning of the first index dot 42 (Fig. 3) in row 17 produces a succession of gating pulses 43 that gate out informational bits corresponding to the dots denoting a character in row 18. For this purpose, the output pulse from differentiator 41 is applied in parallel to a plurality of Phantastrons 45 equal in number to the number of digital positions to be gated out. The output of each of the Phantastrons is then differentiated in a differentiator 46 and applied to a character feeding gate arrangement 47 having five individual gates 48. The gating pulses 43 from differentiator 46 are applied to the gates 48 together with the video signal along line 49. The pulses passing through gates 48 which correspond with the character encoded in row 18 are then stretched in a pulse stretcher 50 to give them a sufficient duration to operate individual relays 51 which relays, in turn, are used to supply adequate current to the teleprinter to cause a character to be printed. It will, of course, be remembered that the teleprinter is adapted to print a character when the proper code signal is applied thereto, and this proper code signal is applied thereto directly from relays 51 and indirectly from the stretched pulses 50 which have passed through character gate 47. After the relays 51 have been set up they prepare the teleprinter 13 for printing the character. A print signal is obtained by delaying one of the pulses from differentiator 46 in a delay circuit 52 and then applying it to the teleprinter 13 to cause it to print the character set up therein. The foregoing operation is of course repeated with succeeding characters until all the characters have been printed. From the foregoing, it is clear how data from a rapidly scanned record is slowly fed to the teleprinter to cause it to print at a suitable rate.

Figure 5:
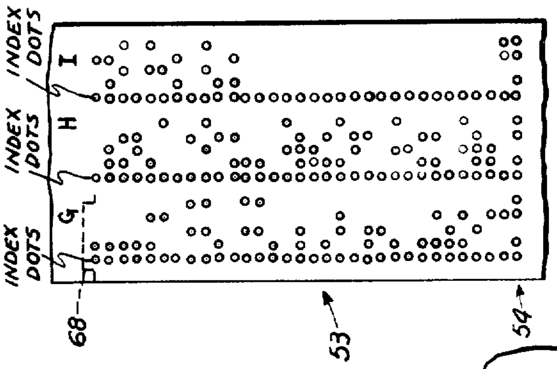
Figure 4A:
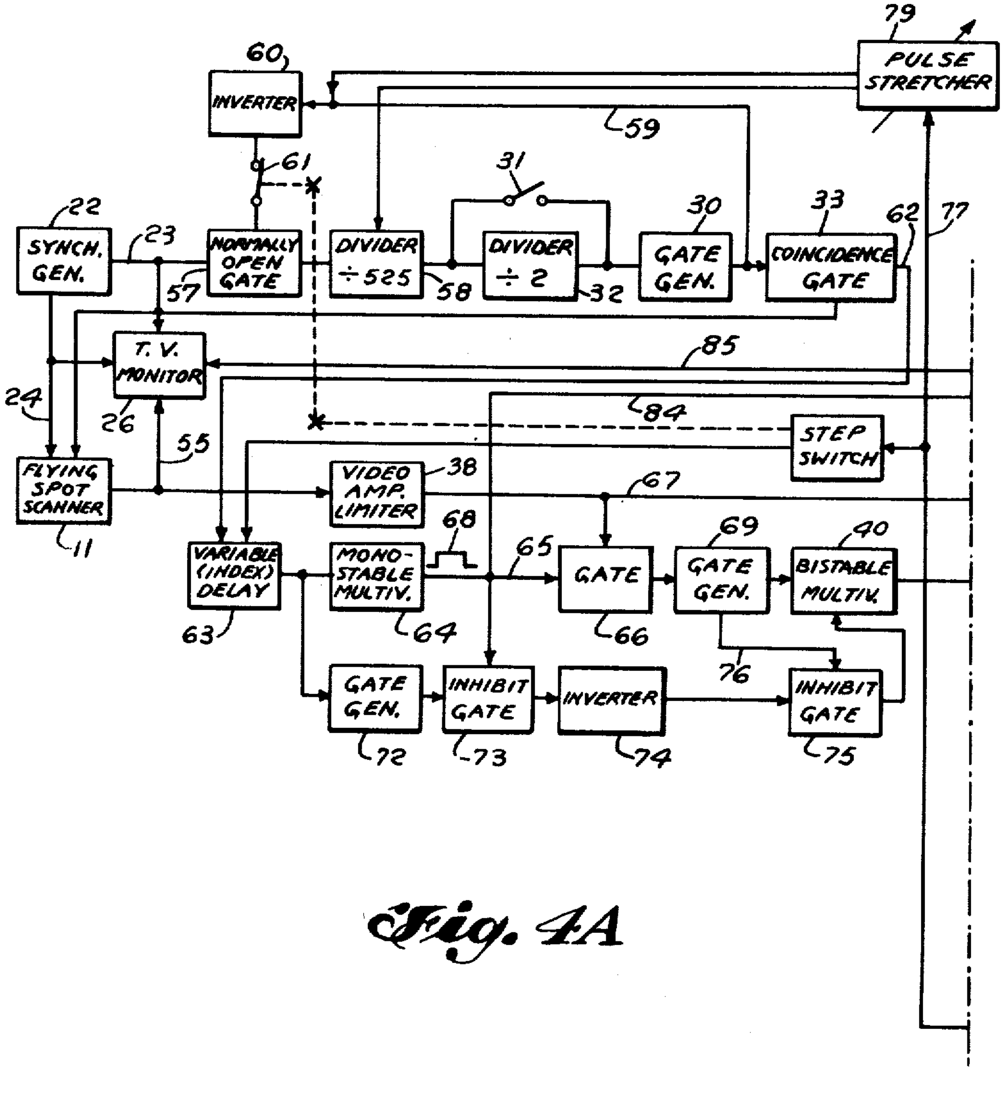
Figs. 4A and 4B are block diagrams of a data processing system showing a modification of the system of Fig. 1 and used for operating a Flexowriter; and, Fig. 5 is a schematic representation of one form of photographic record adapted to be employed in the system of Figs. 4A and 4B.
Figure 4B:
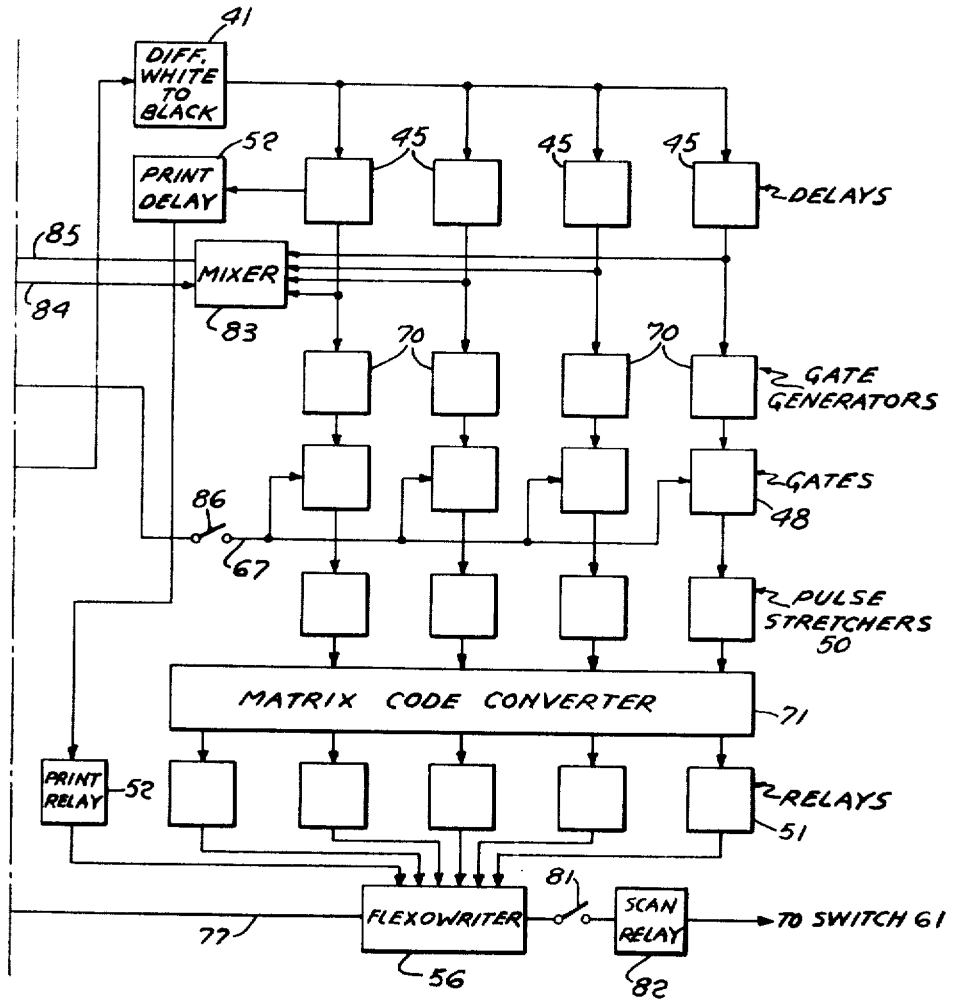

The system of Figs. 4A and 4B is adapted to operate a Flexowriter and may be used to scan a record 53 such as shown in Fig. 5, which has no picture but merely consists of three columns G, H and I of encoded characters, each character having four digital positions in which an informational dot may or may not appear depending upon the code. The index dots precede the informational dots. The record of Fig. 5 is read out and fed to the teleprinter by reading the encoded characters down one column, for example, down "G" until the end of the column is reached, the code pulses appearing along the last row 54 being of a peculiar code which causes the reading to then start afresh from the top of column "H" which is then read down until row 54 of column "H" whereupon the coded signal in row 54 causes the reading to continue with the top of column "I" and to proceed downwardly along said column until row 54 is finally reached whereupon the reading is stopped, and the system is set to begin reading at the first row of the first column of a new record which is then inserted before the flying spot scanner. Several other differences in the operation of the system of Figs. 4A and 4B will also be noted from the following description thereof.

The record 54 is scanned in a flying spot scanner under the control of synchronizing pulses from synchronizing generator 22, the vertical synchronizing pulses being fed along line 24 and the horizontal along output line 23 from said sync generator. These pulses are also applied to the television monitor 26 to synchronize the scanning in the monitor with that in the flying spot scanner 11. For this purpose, the video output of the flying spot scanner is fed along a line 55 to the television monitor. The flying spot scanner repeatedly scans the whole record at a high rate of speed while the encoded character information is fed to a Flexowriter 56 at a slow speed, reading first down the character column "G" of the record and then columns "H" and "I" in sequence. For separating the index pulse a somewhat different divider arrangement is employed in the system of Figs. 4A and 4B. The horizontal synchronizing pulses along line 23 are fed to a normally open gate 57 through a voltage divider 58 which divides by 525 (instead of by 526), with 525 being the number of horizontal scanning lines per frame. The output of divider 58 may be fed directly through switch 31 or through divider 32 to a gate generator 30. The divider 32 may have a dividing ratio of two or more as explained with respect to Fig. 1. The gate generator 30 produces a pulse which is fed back via line 59 and an inverter 60 and a switch 61 to the normally open gate 57 and operates to inhibit or block a single one of the pulses from sync generator 22 as it passes through the gate. It will, therefore, be obvious that for each output pulse from gate generator 30, 526 pulses from sync generator 22 will be counted. Output pulses from gate generator 30 are then applied to a coincidence gate 33 to gate through a single pulse from sync generator 22, which pulse is then fed via line 62 to a variable delay device 63 which is adjusted in a manner that will be described shortly hereinafter. The delayed pulse from the variable delay 63 is fed to a monostable multivibrator 64 which in response thereto produces at its output a pulse whose duration may be several microseconds and may be sufficient to cover the time during which a horizontal sweep moves across an entire character or may be somewhat less. This pulse is then fed along line 65 to a coincidence gate 66 to which gate the video signal is also fed via line 67 after being amplified and limited in the amplifier-limiter 38. The variable delay is so adjusted that the output pulse from monostable multivibrator 64 begins a short time before an index dot of a character column being read is encountered during the horizontal sweep of the scanning light beam across the record and terminates considerably before the next character column is reached. Such a pulse is shown in Fig. 5 in dotted lines and is designated by the numeral 68. When the scanning of a black index dot coincides with an output pulse 68 from multivibrator 64, it is passed through gate 66 and operates a gate pulse generator 69 to trip the anti-repeat bistable multivibrator 40 from its second condition or white condition to its first condition. The output of multivibrator 40 is then differentiated in differentiator 51 to produce a pulse of the proper polarity to operate the character feeding gate mechanism. As in Fig. 1, the output of differentiator 41 is fed through a distributor arrangement consisting of a number of delay devices 45 each producing a different delay, there being four such delay devices to coincide with the four digital positions which are to be examined for the presence or absence of dots defining the code of the next character which is to be printed. The output of delay devices 45 is fed to gating pulse generators 70 whose outputs are, in turn, fed to gates 48. The video signal along line 67 is likewise applied to the gates 48 and when the gates 48 are opened the video pulses representing the encoded character are passed through pulse stretchers 50 to a matrix code converter 71 which converts, where necessary, from the code in which the characters are expressed in the record to a code appropriate to the Flexowriter 56. The output of the code converter 71 is then applied to relays 51 to actuate them according to the code, the output of the relays then being fed to the Flexowriter 56 to prepare the Flexowriter for printing the character. A print signal is obtained from one of the delays 45 and passed through a print delay device 52 whose output operates the print relay after a suitable delay to cause the character to be printed by the Flexowriter 56.

To prevent repeated printing of the same character, a somewhat different arrangement is employed in the system of Figs. 4A and 4B. The output of variable delay 63 which occurs once for every 526 lines and triggers multivibrator 64 to produce pulses 68 (see Fig. 5) also operates a gate generator 72 whose output pulse is somewhat narrower than pulse 68 although their leading edge coincides. The output pulse from gate generator 72 is applied to an inhibiting gate 73 to which pulse 68 is also applied. The output pulse from generator gate 72 cuts off the beginning of pulse 68 and only allows a small portion towards the trailing edge thereof to pass through. This shortened pulse is then inverted in inverter 74 and fed via an inhibiting gate 75 to retrip the bistable multivibrator 40. If, however, an index pulse has been passed through gate 66 and applied to the gate generator 69 so that the output pulse from gate generator 69 along line 76 is applied to the inhibiting gate 75 at the same time as the pulse from inverter 74, it will block said last-mentioned pulse and prevent retripping of the bistable multivibrator. It will be obvious that once the bistable multivibrator has been tripped by a black index pulse from its second to its first condition, the application of further black index pulses to this bistable multivibrator 40 will not change its state.

The scanning of a column continues until at the end of said column in the last row 54, a code signal is encountered which causes the Flexowriter to produce an output signal indicating the end of a column. Obviously, in place of the code signal the index pulses could be counted, particularly those passing through gate 66, and the end of the column could thereby be recognized and an appropriate signal produced for shifting the reading to the next column. When the end of the column is reached, the Flexowriter 56 sends out a pulse along line 77 which operates a step switch 78 controlling the voltage applied to the variable delay circuit 63 which is used in selecting the index pulse. This delays the output pulse from delay 63 so that, for example, after the character column "G" has been read, the index pulses of column "H" are gated through gate 66, and these in turn cause selection of the characters of column "H" and printing thereof in the manner heretofore described.

It is desired once a character column has been read to immediately start examining the next character column for the slow extraction of printed characters therefrom, otherwise the system would continue to examine a succeeding line in each succeeding frame below the end of the printed data. To prevent this unnecessary examination, after the last row of a column has been printed such as, for example, the last row 54 of column "G," the pulse along line 77 from the Flexowriter 56 is fed to a pulse stretcher 79 which produces a very wide output pulse which is fed along line 80 to inverter 60 and then applied through switch 61 to close the normally open gate 57, thereby blocking the feed of horizontal sync pulses to the index pulse selection system, and thereby disabling the character printing arrangement. The width of the pulse from pulse stretcher 79 is such that it blanks out the aforementioned equipment for a period of time commencing with the reading out of the last character in row 54 through the time that the horizontal scanning trace in the same frame moves to the end of the raster and the horizontal scan line of the next frame reaches a point slightly above the first row of characters. The pulse stretcher 79 is adjustable so that its output width may be adjusted for this type of operation. A reset pulse is also fed to the divider 58. At the end of this period gate 57 opens and the next character column is then scanned in the manner heretofore described.

After each successive column is read, the step switch 78 is advanced. If the record has three columns, the step switch is so arranged that at the end of the last column it opens contact 61, after a slight delay, which causes the scanning to begin at the first column of the next record, the step switch likewise resetting the variable index delay 63 for this purpose. The reading of each new record is begun by closing a switch 81 which may be part of the Fexowriter which actuates a scan relay 82 and, in turn, closes switch 61. To stop the scan at any desired point switch 81 may be opened, thereby releasing relay 82 and opening switch 61.

To enable visual monitoring of the entire system, not only is the picture of the record displayed in television monitor 26, but certain critical gating pulses are also displayed to indicate the operation of the system. For this purpose the delayed pulses from delays 45 are fed to a mixer 83, together with pulses 68 from monostable multivibrator 64, the latter along line 84. The output of the mixer 83 is then fed via line 85 to the television monitor 26, but certain critical gating pulses are picture of the record. The pulses from mixer 83 may be applied to the gates to produce blacker dots than the record or whiter dots, and, if necessary, a suitable inversion and amplification may be performed in a well-known manner.

The system of fast scan-slow read-out described hereinabove has many uses. For example, if it is desired to transmit by a narrow band medium the information on a record which is being scanned at high speeds and would normally require a broadband transmission medium, it is possible by the slow read-out technique herein described to use such a narrow band medium for conveying said intelligence. For example, this arrangement would be particularly useful in transmission from a flying spot scanner to a facsimile printer over a narrow band transmission channel.

The system is also adapted for extracting, under manual control, one or more groups of information or informational bits while not transmitting the rest of the record being scanned. For this control of selection, there is provided a switch 86 in line 67 immediately before gates 48 which switch is kept open so that none of the video characters passing through said gate is printed until the gating marks on the monitoring screen approach a character which it is desired to print. The switch 86 is then closed, feeding the video signal to gates 48, and the selected character or characters is then printed. It will be obvious that various other locations for a switch for halting and controlling printing may be employed, such as, for example, in controlling the feed of the print signal to print relay 52. Other ways of inhibiting printing may be employed in various obvious places in the system.

Various types of records may be processed according to the present invention. In Fig. 1 the recorded data is associated with a picture and may, for example, be used in identifying said picture or describing it. Likewise the record of Fig. 5 could be associated with a picture. Obviously other different types of record could be employed.

Accordingly, while I have described my invention above with reference to specific embodiments, it is to be understood that the invention is to be interpreted according to the state of the prior art and the appended claims.

I claim:

1. A system for processing data stored in a record, comprising means for repeatedly scanning said record in successive separate scans and reading the stored data thereon at a given rate of speed to produce a time succession of similar repeated waves each modulated in accordance with the data scanned, means controlled by said scanning means for producing timing pulses, means responsive to said timing pulses for selecting from each of a plurality of said waves a different minor fraction of the data therein, a utilization device, and means for feeding the selected fractions of the data to said utilization device at a slower rate of speed than the speed at which the data on said record is scanned.

2. A selection system for extracting from a periodically repeated wave successive minor portions thereof at spaced intervals, comprising a source of such periodically repeated successive similar waves, each wave consisting of a frame, means coupled to said source and synchronized thereby for producing successive gating pulses each in coincidence with a different one of said frames and with a different mino· portion of successive frames, gating means, means for applying said waves to said gating means, and means for applying each of the gating pulses successively to said gating means for selecting said minor portions of said waves.

3. A selection system according to claim 2, wherein said complex wave has index pulses distributed therein, and said means for producing gating pulses includes timing pulse generator means for producing repeated timing pulses separated from each other by a period greater than the repetition period of said wave, and means responsive to the coincidence of timing pulses from said generating means and index pulses from said wave, for producing said gating pulses.

4. A system for processing data stored on a record in the form of data marks together with index pulses each associated with a group of said data marks, comprising means for repeatedly scanning said record in successive separate scans and reading said marks at a given rate of speed to produce a time succession of repeated similar waves having pulses therein corresponding to said data and index marks, means synchronized with said scanning means for selecting from succeeding ones of said waves different index pulses from each wave, means responsive to each of said selected index pulses for producing a gating pulse, a utilization device, and means responsive to each of said gating pulses for feeding a different one of said groups of said data pulses to said utilization device.

5. A system for processing data stored in a record, comprising means for repeatedly scanning said record in successive separate scans and reading the stored data therein at a given rate of speed to produce a time succession of similar repeated complex waves each modulated in accordance with the data scanned, a monitoring cathode ray tube, means for synchronizing the sweep of the beam in said tube with the sweep of the scanning over the record, means for applying said waves to said cathode ray tube to produce a visual image on its screen of the data stored in the record, a utilization device, means controlled by said synchronizing means for producing timing pulses, means responsive to said timing pulses for selecting, from each of a plurality of said waves, a successive different minor fraction of the data therein, and means for feeding the selected fractions of the data to said utilization device at a slower rate of speed than the speed at which the data on said record is scanned.

6. A system for processing data stored in a record in the form of data and index marks, comprising means for repeatedly scanning said record to produce a succession of repeated complex waves each having pulses therein corresponding to the data and index marks, a timing pulse generator synchronized with said scanning means for producing periodic timing pulses separated by a period greater than that between corresponding points of two successive waves, means responsive to the coincidence of timing pulses and index pulses for producing gating pulses, a utilization device, and means responsive to each of the gating pulses for feeding a different group of said data pulses representing a minor fraction of the data pulses in each wave to said utilization device.

7. A system according to claim 6, further including a source of synchronizing pulses, means responsive to said synchronizing pulses for controlling said scanning means, said timing pulse generator including a pulse frequency divider, coupled to said synchronizing pulse source, and producing an output pulse for a given number of synchronizing pulses, which number is in excess of the number of synchronizing pulses corresponding to one scanning of the record by the scanning means.

8. A system according to claim 6, wherein said scanning means scan said record in sequential lines, each complete scanning of the record being a separate frame, and said timing pulses are separated by a period equal to the period between the time the scanning moves from a point on one line of one frame to a corresponding point on the next line of the next frame.

9. A system according to claim 8, further including means for adjusting said timing pulses to coincide with different ones of said index pulses in different frames.

10. A system according to claim 9, in which the data on said record consists of data marks arranged in rows, the scanning lines running parallel to each other and to said rows, with at least one index mark associated with each row of data marks, the scanning lines being closer to each other than the height of an index mark whereby a plurality of index pulses are produced for each index mark, and further comprising inhibiting means for blocking said coincidence means after one gating pulse has been produced for a corresponding index mark until the next index pulse corresponding to another index mark is fed to said coincidence means simultaneously with a timing pulse.

11. A system for processing data stored in a record in the form of data marks and having index marks each associated with a group of data marks, comprising means for repeatedly scanning said record in a succession of lines so close to each other that each index mark is scanned by at least two successive lines, each complete scanning of the record being a frame, said scanning producing a succession of repeated waves having data pulses and index pulses with at least two index pulses in each said wave corresponding to one index mark, a timing pulse generator synchronized with said scanning means for producing periodic timing pulses separated by a period equal to the period between the time the scanning moves from a point on one line of one frame to a corresponding point on the next line of the next frame, a bistable device, means responsive to the coincidence of one of said timing pulses and one of said index pulses for tripping said device from its first state to its second state, means responsive to the occurrence of one of said timing pulses without the coincidence of one of said index pulses to reset said bistable device, means responsive to the tripping of said bistable device to produce a gating pulse, a utilization device, and means responsive to each gating pulse for feeding a different group of data pulses from a different one of said waves to said utilization device.

12. A system for processing data stored in a record with said data consisting of groups of data marks arranged in parallel spaced rows and an index mark associated with each said group, the index marks being arranged in a column extending transverse to said rows, means for repeatedly scanning said record in lines parallel to said rows, each complete scanning of the record comprising a frame, to produce a repeated succession of waves each including pulses corresponding to said data and index marks, timing pulse generator means synchronized with said scanning for producing timing pulses each corresponding in time with a succeeding line in a succeeding frame at the moment when said line is crossing said column, means responsive to the coincidence of timing pulses and index pulses for producing gating pulses, a utilization device, and means responsive to each of said gating pulses for feeding a different one of said groups of data pulses to said utilization device.

13. A system according to claim 12, wherein said record contains a plurality of columns of such groups of data marks with said data columns extending transverse to said rows, index marks being associated with each group and arranged in index columns, each index mark being associated with a different group of such data marks, said timing pulses corresponding in time with a succeeding line in a succeeding frame when said line is crossing a first one of said index columns, and said gating pulses feeding out the groups of data pulses in a first one of said data columns, means for adjusting said timing pulse generating means after said one column of data marks has been fed to said utilization device to cause said timing pulses to correspond in time with a succeeding line in a succeeding frame when said line is crossing a second one of said index columns, said gating pulses then feeding out groups of data pulses from a second one of said data columns.

14. A system for processing data stored in a record in optical form, comprising means for repeatedly scanning said record and reading the stored data therein at a given rate of speed to produce a succession of repeated complex waves each modulated in accordance with the data scanned, a monitoring cathode ray tube, means for synchronizing the sweep of the beam in said tube with the sweep of the scanning over the record, means for applying said waves to said cathode ray tube to produce a visual image on its screen of the data stored in the record, a utilization device, means for selecting, from each of a plurality of said waves, a different minor fraction of the data therein, means for feeding the selected fractions of the data to said utilization device at a slower rate of speed than the speed at which the data on said record is scanned, said means for scanning the record comprising a flying spot scanner, and a source of synchronizing pulses for synchronizing said record scanning means and said cathode ray tube, said selecting means including counting means connected to said synchronizing pulse source for controlling said selection.

References Cited in the file of this patent

UNITED STATES PATENTS

| | | |
|---|---|---|
| 2,533,242 | Gridley | Dec. 12, 1950 |
| 2,754,360 | Dersch | July 10, 1956 |
| 2,794,965 | Yost | June 4, 1957 |

FOREIGN PATENTS

| | | |
|---|---|---|
| 708,016 | Great Britain | Apr. 28, 1954 |